Patented Apr. 9, 1946

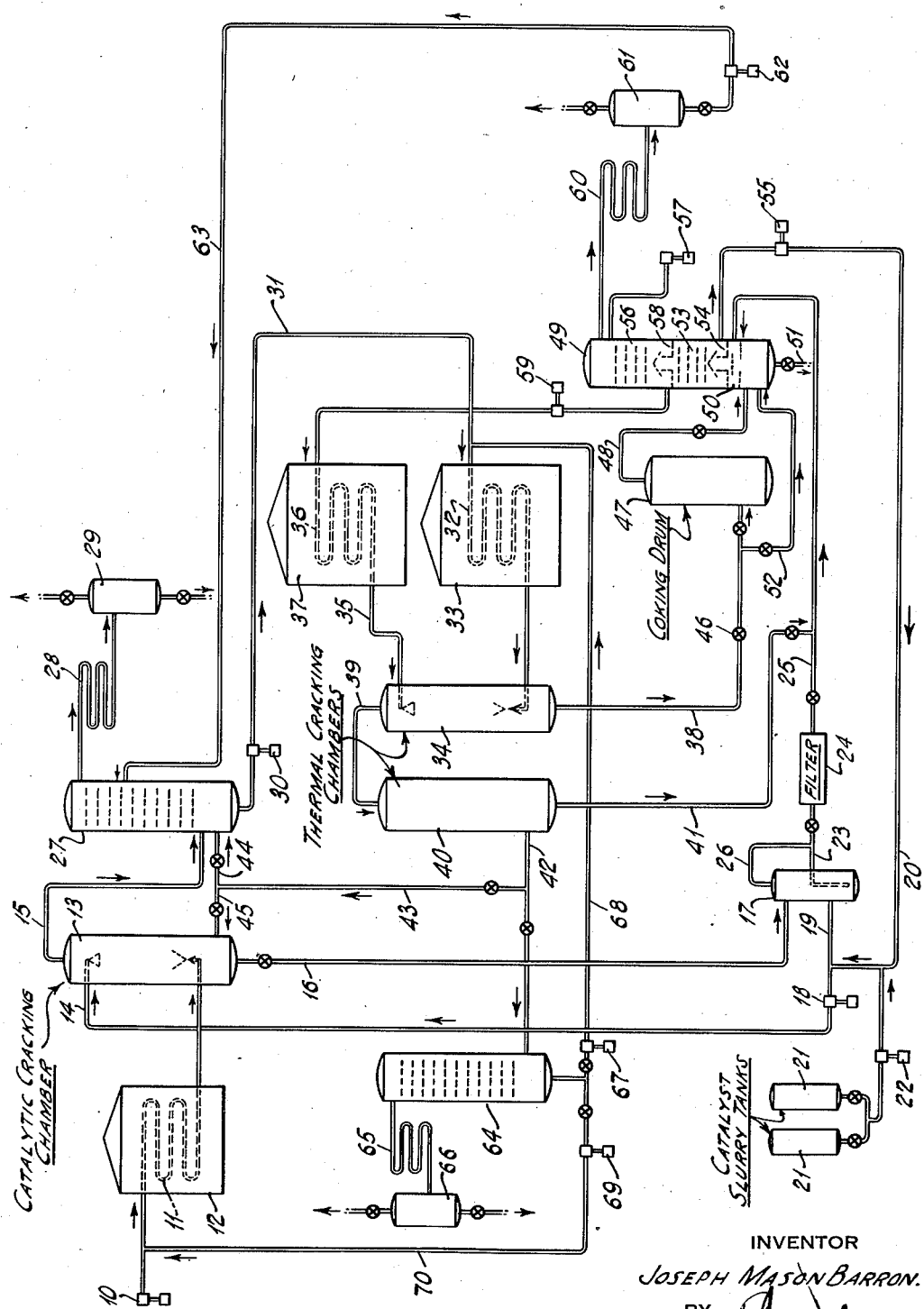

2,398,280

UNITED STATES PATENT OFFICE 2,398,280

CRACKING OF HYDROCARBON OILS

Joseph Mason Barron, Port Arthur, Tex., assignor to The Texas Company, New York, N. Y., a corporation of Delaware Application December 1, 1943, Serial No. 512,461

4 Claims. (Cl. 196—52)

This invention relates to the cracking of hydrocarbon oils for the production of gasoline or motor fuel.

The invention contemplates certain improvements in the catalytic cracking of hydrocarbon oil wherein hydrocarbon oil vapors are contacted with finely divided or powdered catalytic material suspended or dispersed in the vapors under conditions of liquid refluxing. In accordance with the invention the oil is heated and vaporized and delivered to the lower portion of a catalytic reaction zone into the upper portion of which a high boiling liquid containing suspended catalyst is introduced so that the upwardly rising vapors are contacted with dispersed or suspended catalyst and refluxed with the high boiling liquid. Liquid containing catalytic material and vapors are separately withdrawn from the reaction zone. The refluxing serves to prevent the passage of catalyst particles through the vapor line and also functions to prevent coking in the reaction chamber.

In accordance with the invention the liquid containing catalytic material withdrawn from the reaction zone is passed to an accumulator and regulated amounts of liquid containing the catalyst in suspension are returned to the reaction zone so as to establish and maintain a cyclic passage of liquid containing catalyst through the reaction zone. The cycling of the liquid suspension of catalyst provides a method for regulating the residence time of the catalyst in the vapor contacting zone. Portions of the liquid suspension are withdrawn from the circuit and subjected to filtering to recover the oil and the catalyst, after the removal of the oil, is reused in the system. Fresh catalyst is added to the recycle stream as is needed to maintain the desired catalyst activity.

The invention also contemplates certain improvements in combination thermal and catalytic cracking in which higher boiling products from the catalytic cracking operation are subjected to thermal cracking, resultant residual products subjected to low pressure flash distillation or coking and vapors from the flashing or coking operation fractionated to obtain a high boiling fraction which is adapted for preparing the slurry or suspension of catalyst for charging to the catalytic cracking zone and for maintaining a condition of liquidity in withdrawing catalyst therefrom.

For the purpose of more fully disclosing the invention reference is had to the accompanying drawing which is a flow diagram illustrating certain preferred embodiments of the invention.

Charging stock, such as gas oil, is introduced by a pump 10 to a heating coil 11 disposed in a furnace 12 wherein the oil is vaporized and heated to a temperature somewhat higher than that desired for the catalytic cracking. The heated vapors are directed to the lower portion of a vertical reaction chamber 13. A liquid slurry or suspension of catalyst is introduced to the upper portion of the reaction chamber through a line 14 with the result that the finely divided or powdered catalyst is dispersed or suspended in the upwardly rising vapors. Vapors are separately withdrawn from an upper portion of the reaction chamber through a vapor line 15.

Liquid containing powdered catalytic material is withdrawn from the lower portion of the reaction chamber through a line 16 and directed to an accumulator 17. A circulating pump 18 withdraws liquid containing catalyst in suspension from the drum 17 through a line 19 and cycles the liquid suspension through line 14 to the catalytic cracking chamber 13. A high boiling stock, preferably a stock containing higher boiling constituents than those of the stock being passed through the heating coil 11 for catalytic cracking, is introduced through a line 20 to the stream of liquid suspension being recycled by the pump 18. A slurry of fresh catalyst and oil is withdrawn from slurry tanks 21 by a pump 22 and added to the liquid suspension being recycled. The high boiling oil added to the recycle stream should be of sufficiently high boiling point that it will not completely vaporize in transit through the catalytic reaction chamber and so that this high boiling oil, together with any polymer products of reaction, will insure the presence of liquid constituents in the catalytic reaction chamber serving to reflux the vapors and facilitating the withdrawal of catalyst in suspension in the liquid from the bottom of the chamber.

Liquid containing catalyst in suspension is withdrawn from a low point in the accumulator 17 through a line 23 and is directed to a filter 24 wherein the oil component of the slurry or suspension is separated from the catalyst, the recovered oil being removed from the filter through a line 25. A line 26 interconnecting the top of the accumulator 17 and the line 23 may be provided to prevent gas binding. In practice a plurality of filters are used so that while one filter is in operation another filter may be cut out of the system for the removal of the catalyst from the filter leaves without interrupting the continuity of the complete process. The catalyst from the filter 24 is either discarded or reactivated or regenerated for reuse.

The vapor line 15 from the catalytic cracking chamber delivers the vapors to a fractionator 27 wherein the vapors are subjected to fractionation to separate vapors of gasoline or naphtha boiling range from higher boiling reflux condensate. The overhead vapors pass to a condenser 28 thence to an accumulator or gas separator 29 wherein the gasoline or naphtha is collected.

Reflux condensate from the fractionator 27 is directed by a pump 30 through a line 31 to a heating coil 32 disposed in a furnace 33 wherein the oil is subjected to cracking temperature. The heated effluent is passed to a thermal cracking chamber 34, being preferably discharged into a lower portion of such chamber. A high boiling stock, preferably a residual stock, is introduced to the upper portion of cracking chamber 34 through line 35 preferably after such stock has been heated to a cracking temperature in a heating coil 36 disposed in a furnace 37. The evolved vapors from the cracking of the condensate oil pass upwardly in the reaction chamber 34 countercurrently to the downwardly flowing liquid constituents and the commingled constituents are subjected to thermal cracking. Separation of vapors from liquid residue takes place in the reaction chamber, liquid residue being withdrawn through a line 38 and separated vapors being withdrawn through a vapor line 39. The vapors advantageously pass to a succeeding thermal reaction chamber 40 wherein the vapors are subjected to further thermal cracking. Liquid polymer products are withdrawn from the bottom of reaction chamber 40 through a line 41 and separated vapors are withdrawn through a vapor line 42. In both reaction chambers 34 and 40 liquid is withdrawn from the bottom of the chamber at a sufficient rate to prevent the accumulation of liquid therein.

In one method of operation contemplated by the invention the vapors passing through line 42 from the thermal cracking operation are delivered through a line 43 thence either through branch line 44 to the fractionator 27 or through branch line 45 to the catalytic reaction chamber 13. When passing the thermally cracked vapors directly to the fractionator 27 these vapors are subjected to fractionation, together with the vapors from the catalytic cracking step, so that a composite thermally cracked and catalytically cracked gasoline is collected in the accumulator 29. In the alternative operation the vapors from the thermal cracking operation are passed to the catalytic reaction chamber 13 for catalytic conversion therein together with the vapors being delivered from the heating coil 11. In this way the gasoline constituents produced by thermal cracking are subjected to a catalytic conversion or finishing process involving hydrogenation of olefins and certain reactions involving improvement in octane number and susceptibility to tetra-ethyl lead. Moreover, the catalytic cracking of the gas oil constituents contained in the thermally cracked vapors serves to improve these constituents for subsequent thermal cracking. In other words, the reflux condensate withdrawn from the fractionator 27 will consist of hydrocarbons all of which have been subjected to catalytic conversion in the chamber 13 thus providing an improved stock for the thermal cracking in heating coil 32 and reaction chambers 34 and 40.

The liquid residue from the thermal cracking operation, withdrawn through line 38, is passed through a pressure-reducing valve 46 to a coking chamber 47 wherein it is flashed to a coke residue. In practice a plurality of coking drums are used to facilitate the continuous operation of the complete process. Vapors from the coking operation are directed through a vapor line 48 to a fractionating tower 49 for dephlegmation in a primary dephlegmating zone 50 thereof. The oil recovered from the filtering operation, as well as the polymer liquid withdrawn from the thermal cracking chamber 40 through the line 41, is delivered through the line 25 to the dephlegmating section 50 for vaporization and fractionation therein together with the vapors from the coking operation. Dephlegmation at high temperatures, such as temperatures approximating 800° F., under low pressures, such as atmospheric pressure or below 50 lbs., is carried on in the dephlegmating zone 50 to separate a highly aromatic residue adapted for fuel oil which is withdrawn through a line 51.

In lieu of subjecting the cracked residue from the thermal cracking operation to coking, the residue, as withdrawn through line 38 and pressure-reducing valve 46, may be diverted through a line 52 directly to the dephlegmating zone 50 for flash vaporization therein to produce a liquid residue and the evolved vapors dephlegmated with the oil recovered from the filtering operation.

The vapors from the primary evaporating or dephlegmating zone 50 pass to a secondary fractionating or dephlegmating zone 53 wherein the vapors are dephlegmated at high temperatures, approximately 700–800° F., to separate a high boiling reflux condensate collecting on a tray 54. The fractionation is so conducted as to obtain a reflux condensate the major portion of which boils at temperatures above 650–700° F. and which will include considerable constituents boiling at temperatures of 800° F. and higher (as determined by vacuum distillation and interpolated to an atmospheric pressure basis). This high boiling condensate is withdrawn from the tray 54 by a pump 55 and directed through the line 20 to constitute the high boiling stock injected into the mixture of residue and catalyst which is passed to the catalytic cracking zone as has been explained. This high boiling stock may also be used in preparing the slurry with fresh or regenerated catalyst in the slurry tanks 21. Normally there will be some excess in the high boiling condensate collecting in tray 54 over that required in slurrying the catalyst and this excess may be sent to the coking drum or utilized directly in fuel oil production.

The dephlegmated vapors from the fractionating section 53 pass to a succeeding fractionating section 56. A residual charging stock, such as topped or reduced crude petroleum, is introduced by a pump 57 to the dephlegmating zone 56. The resultant mixture of reflux condensate and unvaporized charging stock is withdrawn from a tray 58 and directed by a pump 59 to the heating coil 36 wherein it is subjected to a cracking temperature and then delivered to the thermal cracking chamber 34. Uncondensed vapors from the dephlegmating zone 56 pass to a condenser coil 60 thence to an accumulator or gas separator 61. The distillate collected in this accumulator comprises essentially constituents of the boiling range of light gas oil and kerosene as well as gasoline constituents. This distillate may be employed in a conventional manner for refluxing any or all of the dephlegmating zones 50, 53 and 56 and the remaining distillate may be directed by a pump 62 through a line 63 and refluxed in the fractionating tower 27.

It is sometimes desirable to segregate the thermally cracked and catalytically cracked gasoline as, for example, when it is desired to obtain by catalytic cracking a gasoline product adapted as a blending component for aviation gasoline. In such case the vapors from the catalytic cracking operation are fractionated separately in the fractionator 27 without admixture with thermally cracked vapors and the vapors from the thermal cracking operation passing from the reaction chamber 40 through the line 42 are delivered to a fractionator 64 wherein the vapors are subjected to fractionation to separate the gasoline or naphtha vapors from higher boiling reflux condensate. The overhead vapors pass to a condenser 65 thence to an accumulator or gas separator 66 wherein the thermally cracked gasoline or naphtha is collected. The reflux condensate from the fractionator 64 is either directed by a pump 67 through a line 68 to the heating coil 32 for thermal cracking or is directed by a pump 69 and line 70 to the heating coil 11 for catalytic cracking. When the distillate collecting in the accumulator 61 contains any considerable quantity of gasoline and when it is desired to obtain a catalytic distillate uncontaminated with thermally cracked constituents in the accumulator 29, the distillate from accumulator 61 not used for refluxing in tower 49 may be refluxed in the tower 64 or removed as a separate product.

In one method of operation contemplated by the invention, in which the vapors from the catalytic and thermal cracking operations are fractionated separately, a gas oil stock, such as straight-run gas oil, is charged to the heating coil 11 for single-pass catalytic cracking and the reflux condensate or gas oil from the fractionator 27 is directed to the heating coil 32 either for single-pass thermal cracking or for thermal cracking with recycling of gas oil from the fractionator 64.

In an alternative method a gas oil stock, such as straight-run gas oil, is charged to the heating coil 11 for catalytic cracking, gas oil from the fractionator 27 is subjected to single-pass thermal cracking in the heating coil 32 and reaction chambers 34 and 40 and gas oil from the fractionator 64 is directed to the heating coil 11 for catalytic cracking together with the charging stock gas oil. Single-pass thermal cracking functions to effect the disappearance of paraffins, the concentration of naphthenes and the production of olefins, with considerably less conversion to aromatics than is produced by recycling thermal cracking and since the olefins and naphthenes are the most desirable hydrocarbons for catalytic cracking, the single-pass cracking produces a stock well adapted for sending back to the catalytic cracking zone.

In the catalytic cracking step the oil is completely vaporized in transit through the coil 11 and heated to a somewhat higher temperature than is desired in the catalytic contacting chamber. The liquid suspension when being conducted directly from the accumulating chamber 17 to the contacting chamber will normally be at a somewhat lower temperature than the temperature of the contacting chamber, although the liquid suspension may, if desired, be passed through a heating zone to heat it to approximately the temperature desired in the contacting chamber. The velocity of the upwardly-rising vapors in the contacting chamber serves to suspend the powdered catalyst or delay the descent thereof. The vapors flow upwardly through an extended, unobstructed space in the chamber countercurrently to the high boiling liquid which serves to prevent the carrying-over of suspended catalyst into the vapor line and insures a condition of liquidity at the bottom of the chamber to facilitate the withdrawal of a liquid suspension of powdered catalyst. Temperatures upwards of 850° F., preferably temperatures of 900° F.–1000° F., are maintained in the contacting chamber under superatmospheric pressures, such as 100–200 p. s. i., or lower pressures approximating 50 p. s. i. Pressure filtration of catalyst slurry is accomplished by means of the pressure in the catalyst cracking chamber and accumulator.

Any of the usual catalysts employed in catalytic cracking may be used, including activated clays and synthetic silica-alumina catalysts such as synthetic composites of precipitated silica and alumina. By recycling liquid containing the solid catalyst in suspension from the accumulator to the catalytic reaction chamber the residence time of the catalyst in the reaction zone is controlled. A portion of the liquid suspension is continuously withdrawn from the accumulator, preferably from a lower portion thereof, and subjected to pressure filtration to separate filtrate oil from the solid catalyst. Fresh or regenerated catalyst from the slurry tanks is added to the liquid suspension being recycled to the catalytic cracking chamber to maintain the catalyst concentration desired and to compensate for the withdrawal of catalyst to the filter.

The thermal cracking step is conducted under any suitable conditions for thermal cracking such as temperatures of 850–930° F. under pressures of 200–600 p. s. i. When it is desired to flash the residue from cracking chamber 34 to coke, temperatures of 920–930° F. are desirable in the reaction chamber 34. Coking is conducted at reduced pressures such as 100 p. s. i. or preferably, at pressures approximating 50 p. s. i. or lower.

In the following examples of the invention the processing of a Kansas crude oil is taken as typical. The crude oil is fractionated to obtain a 26.6% gas oil cut of 34.3 A. P. I. gravity and a 26.2% reduced crude fraction of 18.1 A. P. I. gravity. In Example 1 the straight-run gas oil is passed through a single-pass heater with an outlet temperature of 1000° F. and discharged into the counterflow catalytic cracking chamber maintained at 220 lbs. pressure and from which vapors are withdrawn at a temperature of 870° F. and residue containing catalyst is withdrawn at a temperature of 900° F. Liquid residue containing catalyst in suspension is recycled to the reaction chamber with a ratio of slurry oil to charge of 2:1. A catalyst concentration of 5 lbs. per barrel of the oil charged to the heater or of 2.5 lbs. per barrel of the total charge to the catalytic cracking chamber is maintained. The vapors from the catalytic cracking operation are fractionated under 180 lbs. pressure with a top temperature in the fractionator of 400° F. and a bottom temperature of 600° F. The catalytic gas oil is subjected to recycling thermal cracking by being combined with reflux condensate from the fractionator of the thermal cracking unit in a ratio of recycle stock to catalytic gas oil of 4:1, and by heating the mixture to a temperature of 950° F. and discharged into the counterflow thermal soaking chamber maintained under 400 lbs. pressure and from which vapors are withdrawn at a temperature of 900° F. and liquid residue is withdrawn at a temperature of 930° F. The succeeding down-flow soaker is maintained with a vapor outlet temperature of 870° F. and under a pressure of 390 lbs. The thermally cracked vapors are subjected to a separate fractionation at a pressure of 380 lbs. with a top temperature in the fractionator of 450° F. and a bottom temperature of 650° F. The thermally cracked residue from the counterflow reaction chamber is subjected to coking in the coking drum at 100 lbs. pressure and with a temperature of 850° F. in the vapor outlet thereof. The coke drum fractionator is held at 15 lbs. pressure and heavy condensate is withdrawn at a temperature of 800° F. and combined with the catalyst slurry being sent to the catalytic cracking chamber. The reduced crude is introduced to the coke drum fractionator and the resultant mixture of condensate and crude residuum is heated to a temperature of 900° F. and passed into the counterflow thermal reaction chamber. The filtrate, separated from the catalyst in the filtering operation, and the liquid product from the second thermal soaking chamber is sent to the coke drum dephlegmator for the recovery of a fuel oil product.

In a second example of the invention the vapors from the catalytic and thermal cracking steps are fractionated in a common fractionator. Straight-run gas oil is passed through a single-pass heater with an outlet temperature of 950° F. and discharged into the counterflow catalytic cracking chamber maintained at 400 lbs. pressure and from which vapors are withdrawn at a temperature of 860° F. and residue is withdrawn at a temperature of 880° F. The same catalyst concentration as that of Example 1 is maintained. The vapors from both the thermal and catalytic cracking steps are fractionated together under a pressure of 370 lbs. with a top temperature in the fractionator of 450° F. and a bottom temperature of 650° F. The reflux condensate withdrawn from the fractionator is subjected to thermal cracking under conditions similar to those of Example 1 and the coking and dephlegmation of the coke drum vapors are conducted under similar conditions.

In a third example of the invention the straight-run gas oil is charged to the catalytic cracking step, the catalytic gas oil is subjected to single-pass thermal cracking and the thermal gas oil is sent to the catalytic cracking step for conversion with the straight-run charge. The mixture of straight-run gas oil and thermal gas oil from the fractionator of the thermal cracking unit is heated to 950° F. and discharged into the counterflow catalytic cracking chamber. Vapors are withdrawn from the catalytic cracking chamber at a temperature of 880° F. and residue containing catalyst is withdrawn at a temperature of 920° F. The catalytic gas oil is heated to a temperature of 975° F. and directed into the counterflow thermal reaction chamber for cracking together with the effluent from the residual stock heating coil. The other temperature and pressure conditions, including the conditions for coking the cracked residue and dephlegmating the coke drum vapors, are similar to those of Example 1.

Although a preferred embodiment of the invention has been described herein, it will be understood that various changes and modifications may be made therein, while securing to a greater or less extent some or all of the benefits of the invention, without departing from the spirit and scope thereof.

I claim:
1. In the conversion of hydrocarbon oils the process that comprises subjecting hydrocarbon oil vapors to catalytic cracking in a catalytic cracking chamber in contact with powdered catalytic material dispersed therein and under conditions of refluxing with high boiling liquid, withdrawing resultant liquid residue containing powdered catalytic material in suspension from a lower portion of the cracking chamber, separately withdrawing vapors from an upper portion of the catalytic cracking chamber, fractionating said vapors to separate reflux condensate from lower boiling products, passing said reflux condensate through a heating coil wherein it is subjected to a cracking temperature, passing a high boiling fraction formed as hereinafter specified through a second heating coil wherein it is subjected to a cracking temperature, combining the effluent from said heating coils for thermal cracking in a reaction chamber maintained at a cracking temperature under superatmospheric pressure and wherein vapors separate from liquid residue, subjecting said liquid residue to flashing under reduced pressure, subjecting resultant flashed vapors to dephlegmation to form a heavy condensate, adding powdered catalytic material to said heavy condensate to produce a liquid suspension of catalytic material and delivering said liquid suspension to the aforesaid catalytic cracking chamber, subjecting the dephlegmated flashed vapors to further dephlegmation with a residual charging stock and utilizing the resultant mixture of reflux condensate and unvaporized charging stock as the high boiling fraction passed to the aforesaid second heating coil.

2. In the conversion of hydrocarbon oils the process that comprises subjecting hydrocarbon oil vapors to catalytic cracking in a catalytic cracking chamber in contact with powdered catalytic material dispersed therein and under conditions of refluxing with high boiling liquid, withdrawing resultant liquid residue containing powdered catalytic material in suspension from a lower portion of the cracking chamber, separately withdrawing vapors from an upper portion of the catalytic cracking chamber, fractionating said vapors to separate reflux condensate from lower boiling products, subjecting said reflux condensate to thermal cracking and separating resultant products of thermal cracking into vapors and liquid residue, subjecting said liquid residue to flashing under reduced pressure, subjecting resultant flashed vapors to dephlegmation to form a heavy condensate, and adding powdered catalytic material to said heavy condensate to produce a liquid suspension of catalytic material and delivering said liquid suspension to the aforesaid catalytic cracking chamber.

3. In the conversion of hydrocarbon oils the process that comprises subjecting hydrocarbon oil vapors to catalytic cracking in a catalytic cracking chamber in contact with powdered catalytic material dispersed therein and under conditions of refluxing with high boiling liquid, withdrawing resultant liquid residue containing powdered catalytic material in suspension from a lower portion of the cracking chamber, recycling liquid containing powdered catalytic material in suspension to an upper portion of said cracking chamber, separately withdrawing vapors from an upper portion of the catalytic cracking chamber, fractionating said vapors to separate reflux condensate from lower boiling products, subjecting said reflux condensate to thermal cracking and separating resultant products of thermal cracking into vapors and liquid residue, subjecting said liquid residue to flashing under reduced pressure, subjecting resultant flashed vapors to dephlegmation to form a heavy condensate, and adding said heavy condensate to said liquid containing powdered catalytic material being recycled to the catalytic cracking chamber.

4. In the conversion of hydrocarbon oils the process that comprises subjecting hydrocarbon oil vapors to catalytic cracking in a catalytic cracking chamber in contact with powdered catalytic material dispersed therein and under conditions of refluxing with high boiling liquid, withdrawing resultant liquid residue containing powdered catalytic material in suspension from a lower portion of said cracking chamber to an accumulating chamber, recycling a portion of the liquid containing powdered catalytic material from said accumulating chamber to the upper portion of said cracking chamber, passing another portion of said liquid containing powdered catalytic material to a filter wherein it is filtered to separate liquid filtrate from catalytic material, separately withdrawing vapors from an upper portion of the catalytic cracking chamber, fractionating said vapors to separate reflux condensate from lower boiling products, subjecting said reflux condensate to thermal cracking and separating resultant products of thermal cracking into vapors and liquid residue, subjecting said liquid residue to flashing under reduced pressure, subjecting resultant flashed vapors to dephlegmation to form a heavy condensate, combining the aforesaid filtrate with flashed vapors for vaporization and dephlegmation therewith, and adding said heavy condensate to said liquid containing catalytic material being recycled to the catalytic cracking chamber.

JOSEPH MASON BARRON.